United States Patent
Yajima et al.

(10) Patent No.: US 12,247,888 B2
(45) Date of Patent: Mar. 11, 2025

(54) SPACE TEMPERATURE SCANNER AND METHOD FOR DISPLAYING SPACE TEMPERATURE

(71) Applicant: Tokyo Electric Power Company Holdings, Inc., Tokyo (JP)

(72) Inventors: Takeshi Yajima, Tokyo (JP); Akira Hanafusa, Tokyo (JP); Isao Nakayama, Tokyo (JP); Katsuhiko Tanaka, Tokyo (JP)

(73) Assignee: Tokyo Electric Power Company Holdings, Inc., Tokyo (JP)

( * ) Notice: Subject to any disclaimer, the term of this patent is extended or adjusted under 35 U.S.C. 154(b) by 663 days.

(21) Appl. No.: 17/272,235

(22) PCT Filed: Aug. 28, 2018

(86) PCT No.: PCT/JP2018/031747
§ 371 (c)(1),
(2) Date: Feb. 26, 2021

(87) PCT Pub. No.: WO2020/044436
PCT Pub. Date: Mar. 5, 2020

(65) Prior Publication Data
US 2021/0270680 A1      Sep. 2, 2021

(51) Int. Cl.
*G01K 7/02*      (2021.01)
*G01K 1/02*      (2021.01)
(Continued)

(52) U.S. Cl.
CPC ............... *G01K 7/02* (2013.01); *G01K 1/024* (2013.01); *G01K 1/026* (2013.01); *G01K 1/14* (2013.01); *G01P 15/00* (2013.01)

(58) Field of Classification Search
None
See application file for complete search history.

(56) References Cited

U.S. PATENT DOCUMENTS

| 9,157,812 B1 * | 10/2015 | Gennello | G01K 13/00 |
| 2007/0153872 A1 * | 7/2007 | Wu | G01K 1/143 |
| | | | 374/E1.019 |

(Continued)

FOREIGN PATENT DOCUMENTS

| JP | H 04-007675 A | 1/1992 |
| JP | H 07-038930 U | 7/1995 |

(Continued)

OTHER PUBLICATIONS

Temperature sensor array for commercial baking ovens—SCORPION ® | Reading Thermal. (n.d.). Reading Thermal. https://web.archive.org/web/20170405230721/https://www.readingthermal.com/equipment/temperature-sensor-array.html (Year: 2017).*

(Continued)

*Primary Examiner* — Erica S Lin
(74) *Attorney, Agent, or Firm* — Stein IP, LLC

(57) ABSTRACT

A space temperature scanner capable of measuring a temperature distribution in a space without requiring troublesome device installation work or complex data processing is disclosed. The space temperature scanner (scanner 100) of the present invention includes a bar-shaped portable support member 110, attachment units 120 arranged along a straight line on the support member 110, and thermocouple units 130 that can be removably attached to the attachment units 120. The thermocouple units 130 can be selectively attached to some or all of the attachment units 120 when temperature measurement is to be performed.

7 Claims, 10 Drawing Sheets

(51) Int. Cl.
      *G01K 1/024*       (2021.01)
      *G01K 1/14*        (2021.01)
      *G01P 15/00*       (2006.01)

(56) References Cited

U.S. PATENT DOCUMENTS

| | | | | |
|---|---|---|---|---|
| 2007/0165692 | A1* | 7/2007 | Liu | G01K 1/143 |
| | | | | 374/E1.019 |
| 2014/0172392 | A1* | 6/2014 | Eldershaw | G06T 17/00 |
| | | | | 703/6 |
| 2016/0061755 | A1* | 3/2016 | Delius | G01N 33/42 |
| | | | | 374/43 |
| 2017/0148184 | A1* | 5/2017 | Kraus | G06T 7/60 |

FOREIGN PATENT DOCUMENTS

| | | |
|---|---|---|
| JP | 2000-241203 A | 9/2000 |
| JP | 2000-310569 A | 11/2000 |
| JP | 2008-145249 A | 6/2008 |
| JP | 2009-222657 A | 10/2009 |
| JP | 2014-504363 A | 2/2014 |
| JP | 2015-187798 A | 10/2015 |
| JP | 2015-190765 A | 11/2015 |
| JP | 2016-038277 A | 3/2016 |

OTHER PUBLICATIONS

Archived webpage Reading Thermal (Year: 2017).*
International Search Report dated Nov. 20, 2018, issued to corresponding International Application No. PCT/JP2018/031747.

* cited by examiner

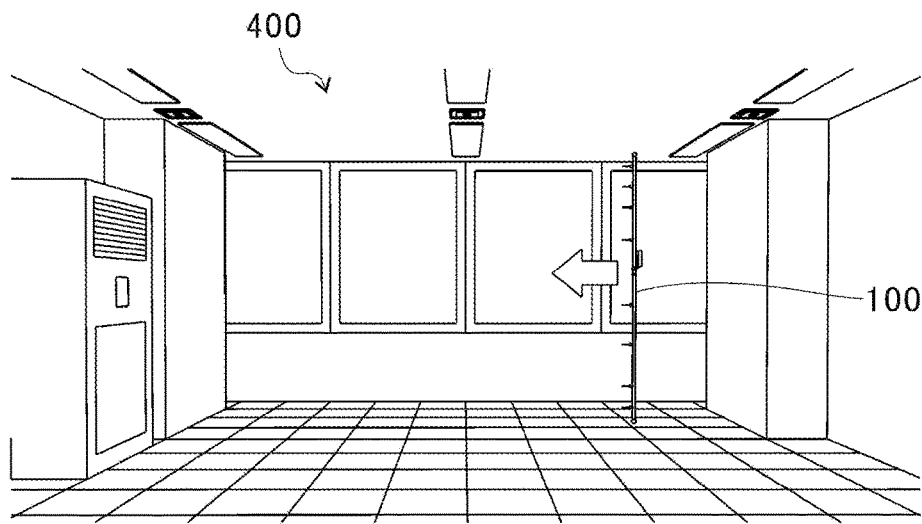
FIG. 9(a)
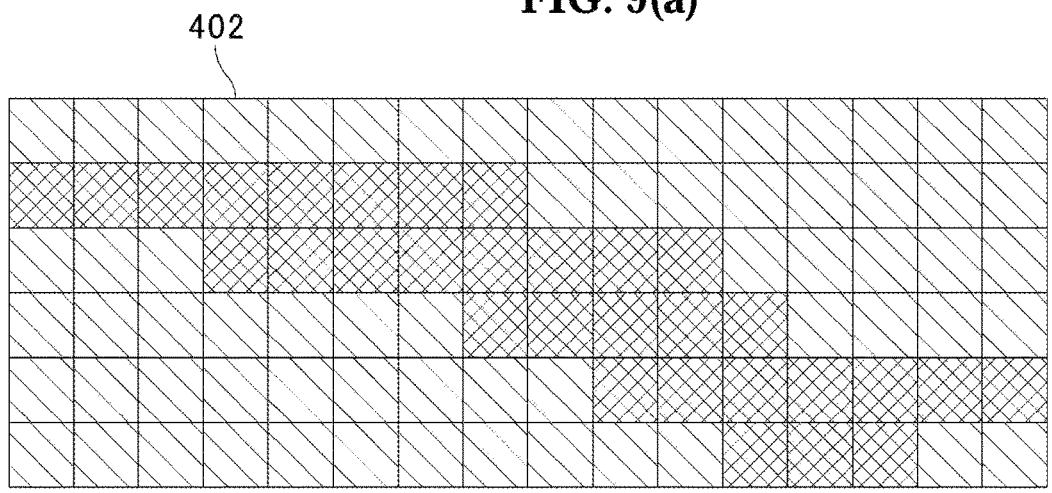
FIG. 9(b)
FIG. 9(c)
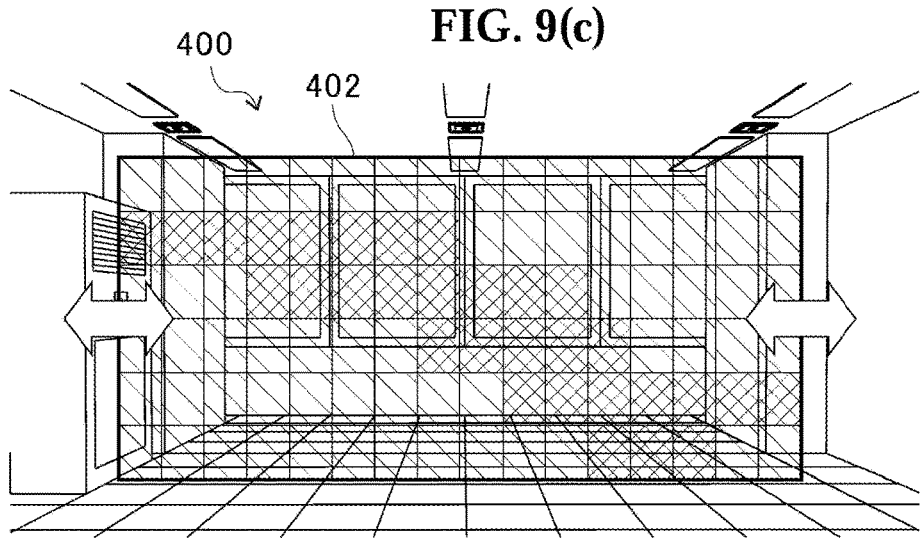

SPACE TEMPERATURE SCANNER AND METHOD FOR DISPLAYING SPACE TEMPERATURE

CROSS-REFERENCE TO RELATED APPLICATIONS

This application is a National Stage Application, under 35 U.S.C. § 371, of International Application No. PCT/JP2018/031747, filed Aug. 28, 2018. The above-identified application is incorporated by reference herein in its entirety.

TECHNICAL FIELD

The present invention relates to a space temperature scanner for measuring a temperature distribution in a space and a space temperature display method.

BACKGROUND

Conventional methods for measuring a temperature distribution in a space inside a building or the like include a method of disposing multiple thermometers, a method that uses a radiation thermometer and detection plates that have a low heat capacity, and a method that uses the propagation speed of sound waves or ultrasonic waves.

One example of a method that uses a radiation thermometer and detection plates is a space temperature measuring and monitoring system disclosed in Patent Document 1. In Patent Document 1, multiple temperature detection bodies, which emit infrared light in correspondence with the temperature, are disposed at predetermined locations in a space, and temperatures in the space are detected by detecting the temperatures of the temperature detection bodies based on the amount of infrared light that they emit.

One example of a method that uses the propagation speed of sound waves or ultrasonic waves is a space temperature measuring method disclosed in Patent Document 2. In Patent Document 2, ultrasonic wave oscillators are arranged at two different intersection points on opposing sides of a central position in a measurement target space, and a detector detects a difference tone of ultrasonic waves emitted from the two ultrasonic wave oscillators. The space temperature is then calculated based on a difference in the ultrasonic wave arrival time and sound propagation path.

RELATED DOCUMENTS

Patent Documents

Patent Document 1: Japanese Patent Laid-open Publication No. H10-38698
Patent Document 2: Japanese Patent Laid-open Publication No. 2010-139251

Problems to be Solved

However, methods of disposing multiple thermometers have a problem in that installation is difficult in the case where the thermometers are disposed on a ceiling or are hung from balloons or the like. Also, methods that use detection plates and a radiation thermometer have a problem in that installation of the detection bodies is difficult, and performing accurate measurement is difficult because the detection bodies hinder the flow of air in the space. Methods that use the propagation speed of sound waves or ultrasonic waves have a problem in that installation of the transmitters and the receiver is difficult, and signal processing is difficult.

SUMMARY

The present invention was achieved in light of such problems, and an object of the present invention is to provide a space temperature scanner that can measure a temperature distribution in a space without requiring troublesome device installation work and/or complex data processing. Disclosed embodiments also provide a space temperature display method that displays measured space temperatures.

In order to solve the above-described problems, a representative configuration of a space temperature scanner according to the present invention includes: a bar-shaped portable support member; a plurality of attachment units arranged along a straight line on the support member; and a plurality of thermocouple units configured to be removably attached to the attachment units, wherein the thermocouple units can be selectively attached to a portion or all of the attachment units when measurement is to be performed.

In the above configuration, thermocouple units are attached to attachment units on the bar-shaped support member, and then the support member is arranged in a space. This therefore makes it possible to arrange multiple thermocouple units in a space all at once. Using such thermocouple units makes it possible to acquire temperatures in a space without performing complex data processing. Therefore, according to the above configuration, it is possible to provide a space temperature scanner that can measure a temperature distribution in a space without requiring troublesome device installation work or complex data processing.

Furthermore, in the above configuration, the attachment units are arranged along a straight line. Accordingly, for example, if the temperature distribution is to be measured in particularly the upper portion of a space, it is possible to easily adjust the measurement positions by, for example, arranging thermocouple units in the attachment units in the upper portion of the support member. Also, a larger number of thermocouple units can be arranged at the height where the space temperature is to be measured in more detail for example, thus making it possible to increase the degree of freedom in measurement.

It is preferable that each of the thermocouple units includes a connector configured to be connected to the attachment unit, and a two-wire fine-wire thermocouple that protrudes from the connector. According to this configuration, the thermocouple units can be easily attached to the support member by connecting the connectors to the attachment units. Also, because fine-wire thermocouples have excellent thermo-responsiveness, the temperature in the space can be measured accurately and efficiently.

It is preferable that there are a plurality of the support members that can be coupled together by a joint, a hinge, or a slide rail. Accordingly, the space temperature at a higher position can be measured by coupling together multiple support members. The capability to couple multiple support members together implies a capability to be disassembled. Accordingly, the support members can be transported in a disassembled state, thus making it possible to improve portability.

It is preferable that each of the thermocouple units includes a reflection member for motion capture. Accordingly, it is possible to acquire position information regarding the position of the space temperature scanner in the space.

This therefore makes it possible to measure the temperature distribution in the space more easily and accurately.

It is preferable that the support member includes an acceleration sensor. According to this configuration as well, it is possible to acquire position information regarding the position of the space temperature scanner in the space, thus making it possible to measure the temperature distribution in the space more easily and accurately.

It is preferable that the support member is configured such that the thermocouple units can be stowed inside the support member. Accordingly, thermocouple units that are attached to the support member but are not to be used in space temperature measurement can be stowed in the support member. For this reason, it is not necessary to remove thermocouple units, thus making it possible to improve the work efficiency. Also, because there is no need to remove thermocouple units, it is possible to reduce the number of opportunities for the fine-wire thermocouples of the thermocouple units to come into contact with surrounding objects. This therefore makes it possible to favorably prevent damage to the fine-wire thermocouples that can occur during removal.

It is preferable that the space temperature scanner further includes a wheel fixed to a lower end of the support member. According to this configuration, the wheel fixed to the lower end of the support member can roll on the floor of the measurement space while the space temperature scanner is moved. This therefore makes it possible to favorably suppress vertical shake in comparison with the case where the wheel is not provided and the space temperature scanner is moved while the support member is held by a worker.

It is preferable that the space temperature scanner further includes LEDs that change color according to a temperature. According to this configuration, the space temperatures that have been measured can be visually perceived by observing the color of the LEDs.

In order to solve the above-described problems, a representative configuration of a space temperature display method according to the present invention includes the steps of: measuring space temperatures in a predetermined space; and generating tile images that show a temperature distribution of the measured space temperatures by color, and displaying the tile images superimposed on a 2D image of the space in which the space temperatures were measured. According to this configuration, by referencing the 2D image of the space where the space temperatures were measured (hereinafter, called the measurement space), it is possible to visually perceive the space temperature at various locations throughout the measurement space.

In order to solve the above-described problems, another representative configuration of a space temperature display method according to the present invention includes the steps of: measuring space temperatures in a predetermined space; and generating a curtain image that shows a temperature distribution of the measured space temperatures by color, and displaying the curtain image superimposed on a 3D model of the space in which the space temperatures were measured. According to this configuration, by referencing the 3D model of the measurement space, it is possible to visually perceive the space temperature at various locations throughout the measurement space.

In order to solve the above-described problems, another representative configuration of a space temperature display method according to the present invention includes the steps of: measuring space temperatures in a predetermined space; and generating a curtain image that shows a temperature distribution of the measured space temperatures by color, and displaying the curtain image superimposed in a VR spatial image. According to this configuration, by referencing the VR spatial image, it is possible to visually perceive the space temperature at various locations throughout the measurement space while moving through the VR space.

Technical Effects

According to the present invention, it is possible to provide a space temperature scanner that can measure the temperature distribution in a space without requiring troublesome device installation work and without requiring complex data processing, and also a space temperature display method that displays a measured space temperature.

BRIEF DESCRIPTION OF THE DRAWINGS

FIG. 6($b$) schematically shows a space 102 being filmed with a motion capture camera.

FIGS. 9($a$), 9($b$) and 9($c$) illustrate a third embodiment of a space temperature display method.

INDEX TO REFERENCE NUMERALS

Figure 5:
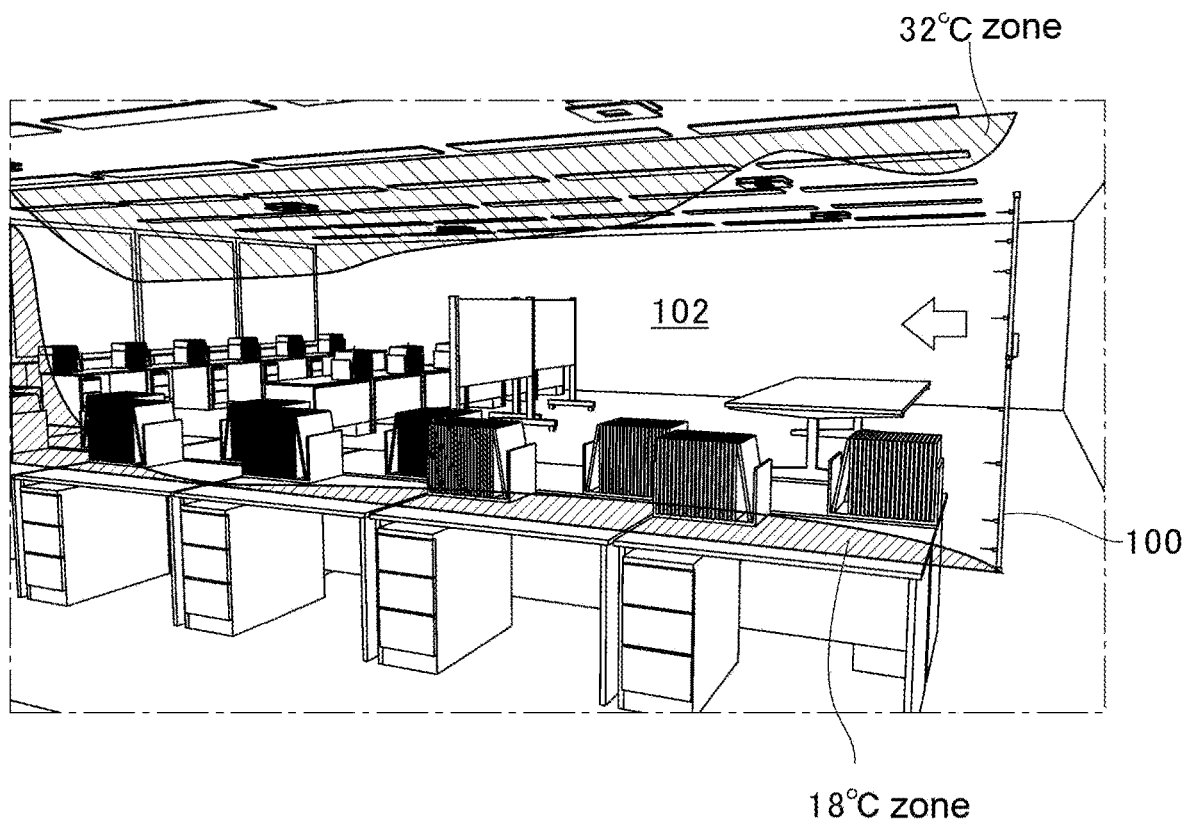
FIG. 5 is a diagram illustrating a space temperature measuring method that uses a temperature scanner according to an embodiment.

100 . . . scanner;
102 . . . space;
110 . . . support member;
110$a$ . . . hole;
112 . . . upper support member;
112$a$ . . . coupling portion;
114 . . . lower support member;
114$a$ . . . coupling portion;
120 . . . attachment unit;
120$a$-120$h$ . . . attachment unit;
130 . . . thermocouple unit;
130$a$ . . . thermocouple unit;
132 . . . connector;
134 . . . fine-wire thermocouple;
140 . . . logger;
142 . . . wire;
200 . . . scanner;
220 . . . attachment unit;
222 . . . projection;

224 . . . guard portion;
300 . . . scanner;
302 . . . LED;
304 . . . handle;
306 . . . wheel;
400 . . . predetermined space;
402 . . . tile image;
404 . . . curtain image.
32° C. zone (FIG. 5)
18° C. zone (FIG. 5)

DETAILED DESCRIPTION

Referring to the accompanying drawings, the following is a detailed explanation of preferred embodiments of the present invention. All dimensions, materials and further specific numbers shown in the embodiments are merely given as examples in order to aid the understanding of the invention, and are not meant to limit the present invention, unless this is explicitly stated so. It should be further noted that throughout this specification and in the drawings, elements that have substantially the same functionality and/or structure are denoted by the same reference numerals and redundant descriptions of such elements are omitted. Furthermore, in some instances, some aspects that are not directly related to the disclosed embodiments may not be shown in the figures and/or described herein.

Figure 1:
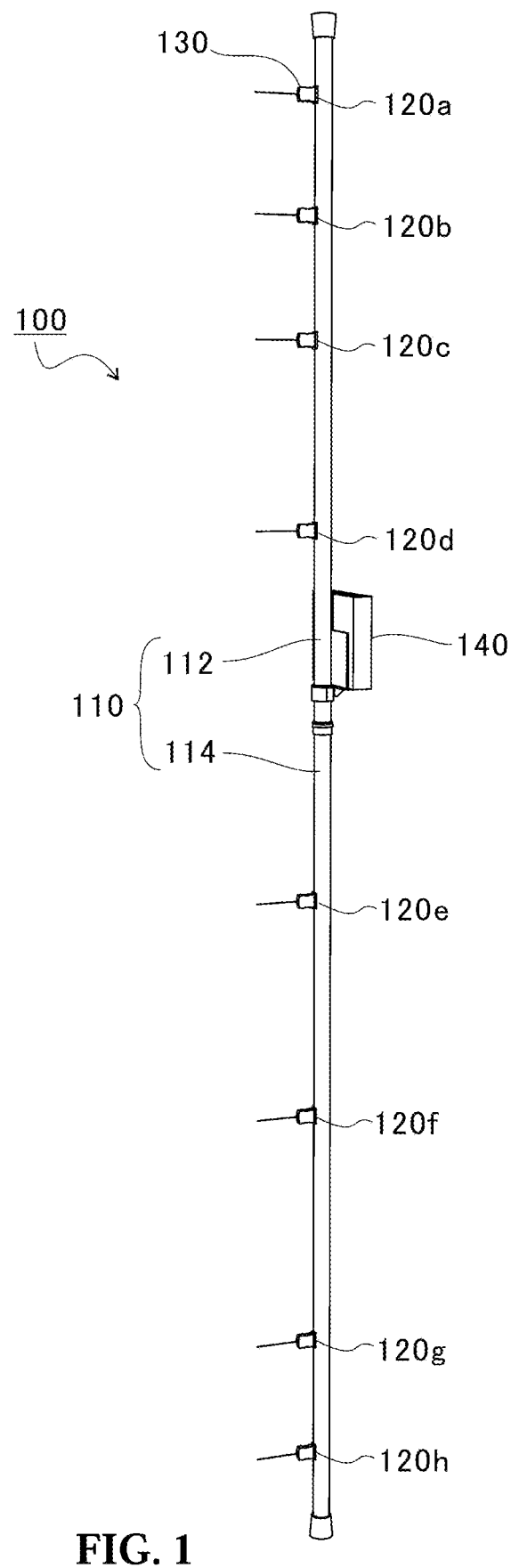
FIG. 1 is a diagram illustrating a space temperature scanner according to an embodiment.

FIG. 1 is a diagram illustrating a space temperature scanner 100 (hereinafter, referred to as "scanner 100") according to an embodiment. As shown in FIG. 1, the scanner 100 of the present embodiment includes a bar-shaped portable support member 110, and attachment units 120a to 120h, which are arranged along a straight line on the support member 110. For example, a PVC pipe can be favorably used as the support member 110. In the following description, the attachment units 120a to 120h may be referred to as collectively as attachment units 120 (e.g., when there is no specific reason to distinguish between the individual attachment units).

Thermocouple units 130 are removably attached to the attachment units 120, and the temperature of a space may be measured by the thermocouple units 130. FIG. 1 shows an example configuration in which thermocouple units 130 are attached to all of the attachment units 120. However, this is not a limitation, and thermocouple units 130 may be selectively attached to one or more of the attachment units 120.

Further, in FIG. 1, various gaps are shown between attachment units 120a to 120h. However, this is not a limitation and the gaps between the attachment units 120a to 120h can be changed as appropriate, and, in some instances, for example, the gaps may all be equal. In the present embodiment, in order to obtain more detailed information regarding the temperature distribution of the upper region of a space, the gaps between the attachment units 120a to 120c arranged at the upper portion of the support member 110 can be set smaller such that the thermocouple units 130 are arranged more densely. Furthermore, although FIG. 1 shows an example configuration including eight attachment units 120, the number of attachment units 120 is not a limitation, and may be changed as desired.

Figure 2A:
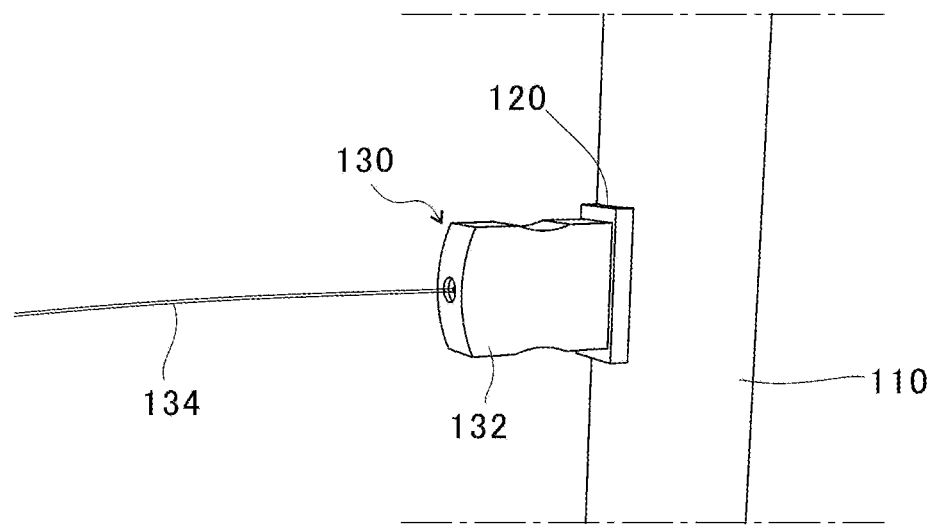
FIGS. 2($a$) and 2($b$) show detailed views of a thermocouple unit.
Figure 2B:
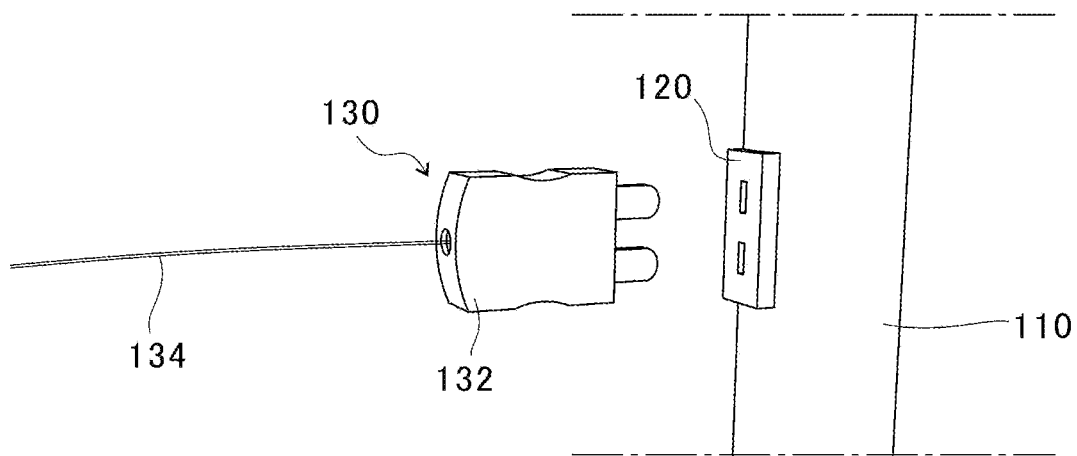

FIGS. 2(a) and 2(b) show detailed views of a thermocouple unit 130. As shown in FIGS. 2(a) and 2(b), in the present embodiment, the thermocouple unit 130 is configured by a connector 132 and a two-wire fine-wire thermocouple 134. The fine-wire thermocouple 134 is arranged so as to protrude from the connector 132.

As shown in FIG. 2(b), the attachment unit 120 provided on the support member 110 is socket-shaped. By connecting the connector 132 to the socket-shaped attachment unit 120, the thermocouple unit 130 is attached to the support member 110 as shown in FIG. 2(a), and is also electrically coupled to a logger 140 (FIG. 1). In this way, with the scanner 100 of the present embodiment, the thermocouple units 130 can be easily attached to the support member 110.

Also, as described above, the fine-wire thermocouples 134 are used as the thermocouples in the present embodiment. The fine-wire thermocouples 134 have a low heat capacity and fast response speed, and thus have excellent thermo-responsiveness properties thereby facilitating measurement of the space temperature accurately and efficiently. Also, because the fine-wire thermocouples 134 have a high thermal responsiveness (i.e., a good ability to track the space temperature), it is possible to acquire the space temperature without needing to perform troublesome data processing for correction and compensation.

Figure 3:
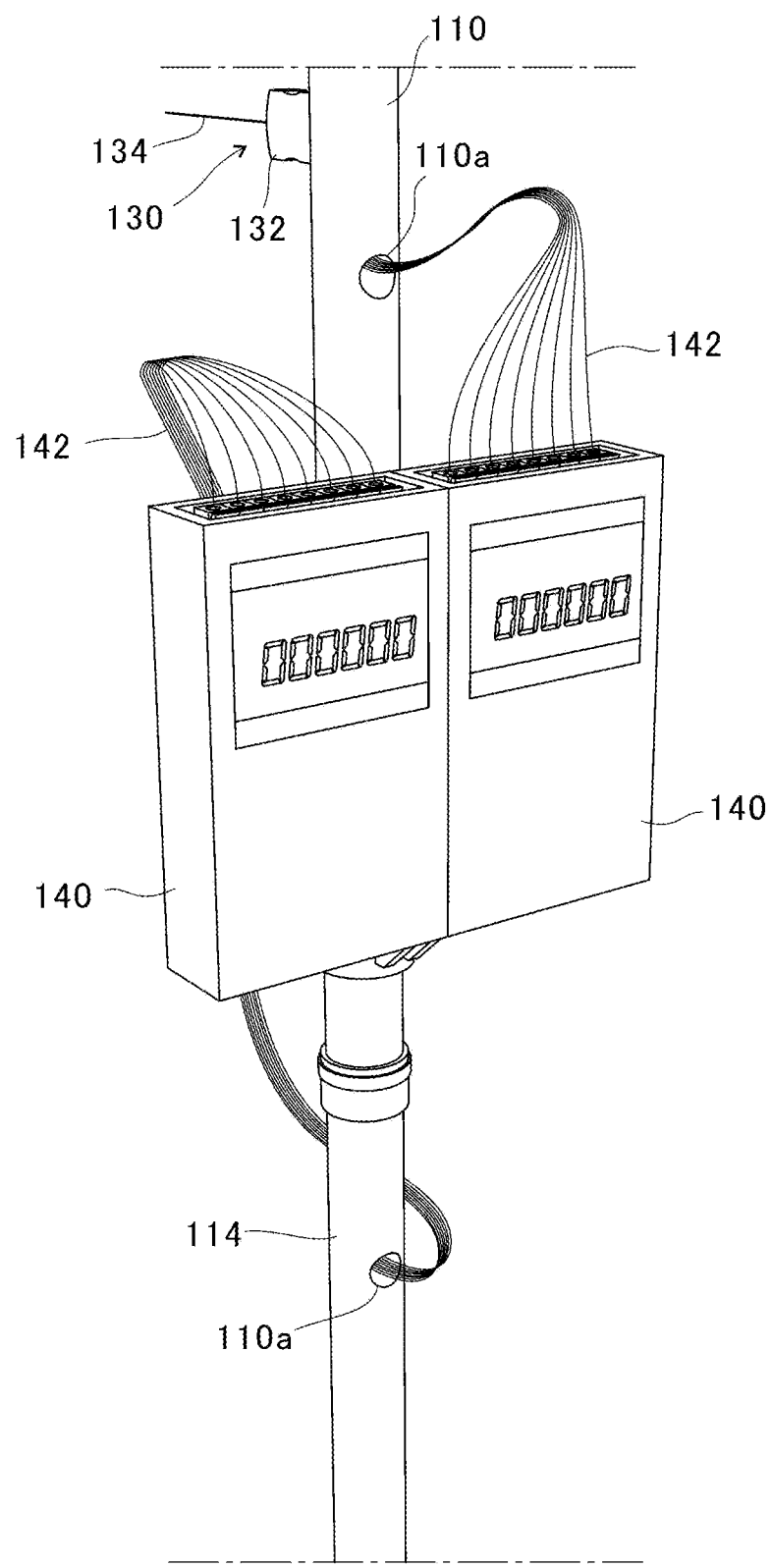
FIG. 3 is an enlarged view of the scanner in FIG. 1.

FIG. 3 is an enlarged view of the scanner 100 in FIG. 1. The ends on one side of wires 142 (not shown in FIG. 1) are connected to the attachment units 120 in FIG. 1. As shown in FIG. 3, the wires 142 are drawn out from the support member 110 through a hole 110a formed in the support member 110, and the other ends of wires 142 are connected to the logger 140. Data indicating the space temperatures measured by the thermocouple units 130 is thus stored in the logger 140.

Figure 4:
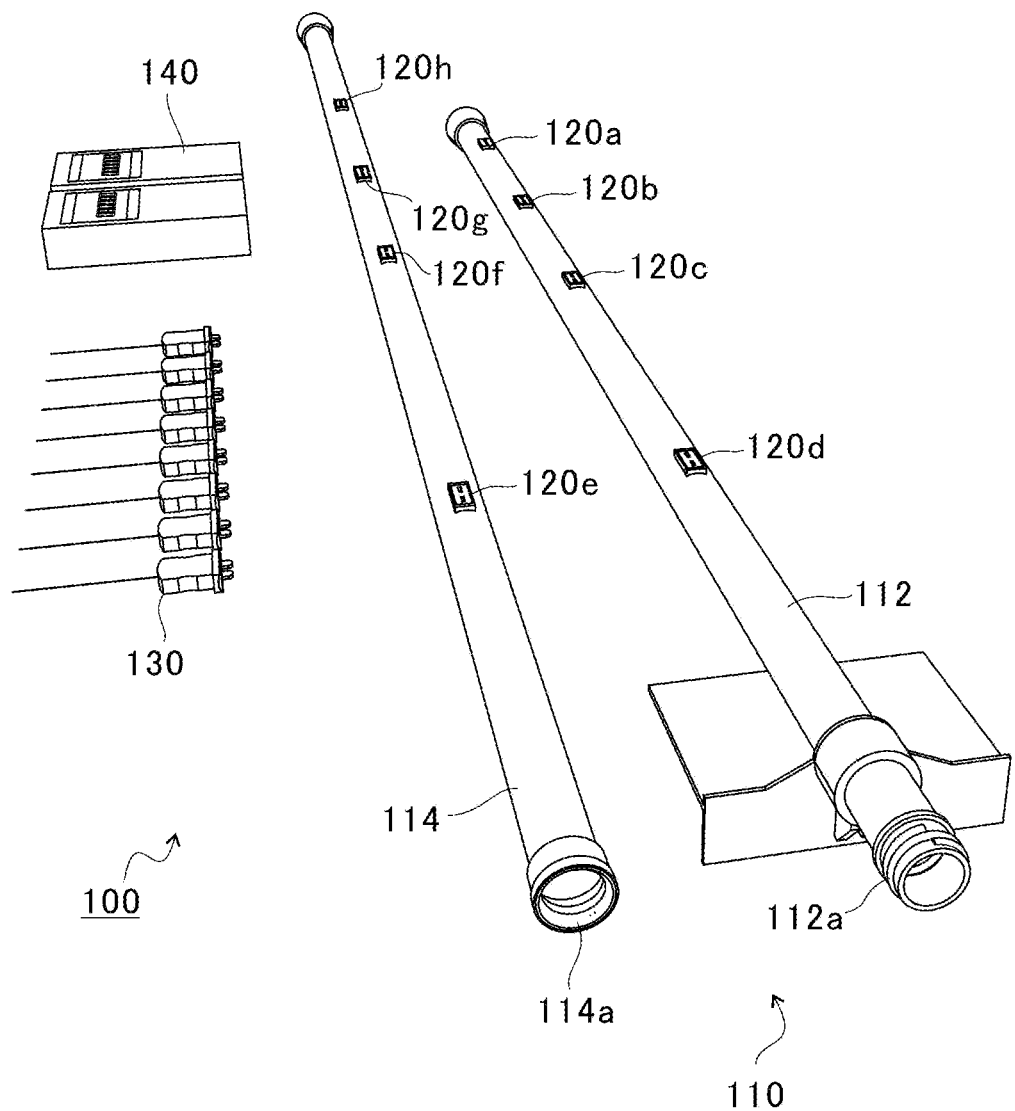
FIG. 4 is an exploded view of the scanner in FIG. 1.

FIG. 4 is an exploded view of the scanner 100 in FIG. 1. The scanner 100 in FIG. 1 is as shown in FIG. 4 when disassembled. Specifically, the support member 110 is constituted by an upper support member 112 and a lower support member 114. The upper support member 112 and the lower support member 114 respectively have coupling portions 112a and 114a. The integrated support member 110 shown in FIG. 1 is obtained by coupling the upper support member 112 and the lower support member 114 together using the coupling portions 112a and 114.

According to this configuration, the space temperature at higher positions can be measured by coupling multiple support members, namely the upper support member 112 and the lower support member 114. Also, the support member 110 can be easily transported when disassembled into the upper support member 112 and the lower support member 114. This therefore makes it possible to improve portability. Note that although a configuration in which the coupling portions 112a and 114a achieve coupling using male threading and female threading is given as an example in the present embodiment, there is no limitation to this. Examples of other coupling methods include mated coupling, a non-separating configuration using a foldable hinge, and a non-separating configuration using a telescoping slide rail.

FIG. 5 is a diagram illustrating a space temperature measuring method that uses the scanner 100 of the present embodiment. When the space temperature is to be measured, first, the thermocouple units 130 are attached to the attachment units 120 of the bar-shaped support member 110. Next, a worker (not shown) grips the support member 110 and moves it in a space 102. Space temperatures are thus measured by the thermocouple units 130, and corresponding data is stored in the logger 140. By accumulating space temperature data, it is possible to acquire a temperature distribution at a cross-section such as a 32° C. zone and an 18° C. zone as shown in FIG. 5.

As described above, according to the scanner 100 of the present embodiment, a worker can measure the space temperature by carrying the scanner 100 into a space instead of installing devices at various measurement sites. Accordingly, it is possible to eliminate the conventional need for the worker to perform device attachment, and measurement work can be performed easily.

Also, with the scanner 100 of the present embodiment, the thermocouple units 130 can be attached and removed along the height direction of the support member 110. Accordingly, the arrangement of the thermocouple units 130 can be changed along the direction in which temperature measurements are to be obtained. Furthermore, in the present embodiment, space temperatures are measured accurately using the thermocouple units 130, thus making it possible acquire space temperatures without performing complex data processing.

Note that although a method in which the worker performs space temperature measurement while moving is given as an example in the present embodiment, there is no limitation to this, and space temperature measurement can be performed while the scanner 100 is disposed at a fixed point. Although not shown in the drawings, if the scanner 100 is configured such that a wheel is attached to the lower end of the support member 110 for example, the worker can move the scanner 100 more easily and the measurement height becomes more stable, thus making it possible to improve the work efficiency. In the case of being disposed at a fixed point, the scanner 100 may be configured such that a stand is attached to the lower end of the support member 110.

It is preferable that the fine-wire thermocouple 134 of each of the thermocouple units 130 has a wire diameter of 25 μm or less and a length of 100 mm or more. Accordingly, it is possible to favorably ensure the ability to track the space temperature when the worker performs measurement while moving. Also, it is desirable that the interval at which data is stored in the logger 140, that is to say the space temperature measurement interval, is 100 msec or less.

Figure 6A:
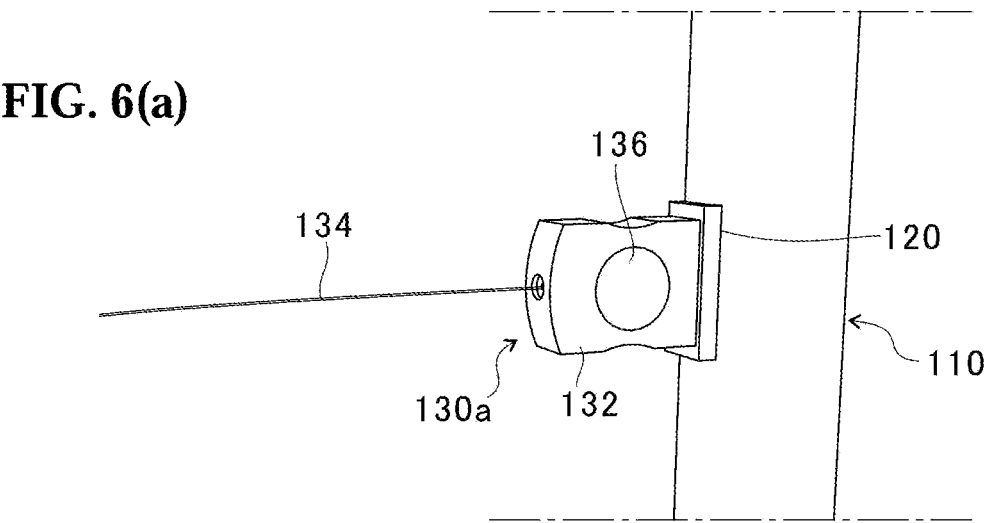
FIG. 6($a$) illustrates an example of a thermocouple unit that includes a motion capture reflection member 136 affixed to a side surface of connector 132.
Figure 6B:
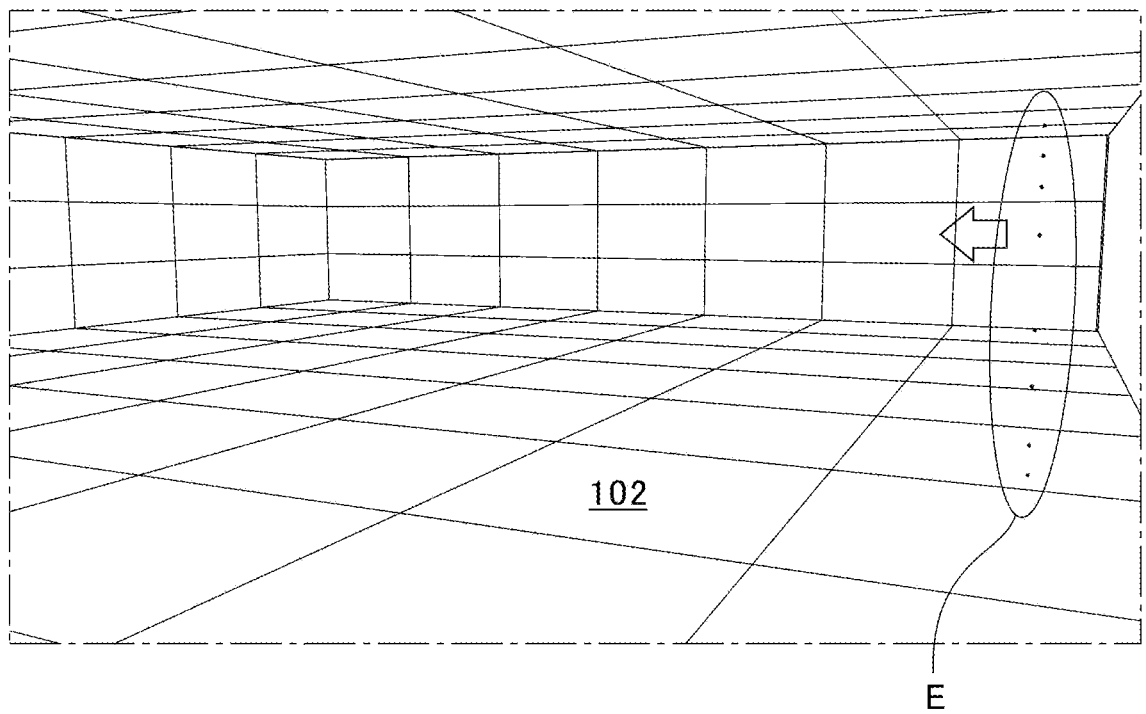

FIGS. 6(a) and 6(b) is illustrate another example of temperature measurement using the thermocouple unit 130. Note that constituent elements that are same as those of the thermocouple units 130 described above are denoted by the same reference signs, and descriptions are not given for them. As shown in FIG. 6(a), a thermocouple unit 130a further includes a motion capture reflection member 136 that is affixed to a side surface of the connector 132.

FIG. 6(b) schematically shows the case where a space 102 is being filmed with a motion capture camera. Due to the thermocouple unit 130a including the motion capture reflection member as described above, when the motion capture camera (not shown) is used to film a worker moving through the space, bright points (shown by black dots) where the thermocouple units 130a are located are observed as shown in an oval E in FIG. 6(b). Accordingly, it is possible to acquire information indicating the position of the scanner 100 in the space 102.

According to the above configuration, if a log of position information obtained by filming with the motion capture camera is matched with a log of space temperature information obtained by the thermocouple units 130, it is possible to easily and accurately obtain a temperature distribution in the space. If temperature distributions are displayed superimposed on an interior photo of the space for example, it is possible to visually perceive the space temperature as shown in FIG. 5 (first embodiment of a display method).

Note that although a method of acquiring position information with use of the motion capture reflection members 136 is described in the above configuration, there is no limitation to this. For example, in a configuration in which an acceleration sensor (not shown) is attached to the support member 110, it is possible to acquire position information regarding the support member 110 and obtain effects similar to those described above.

Figure 7A:
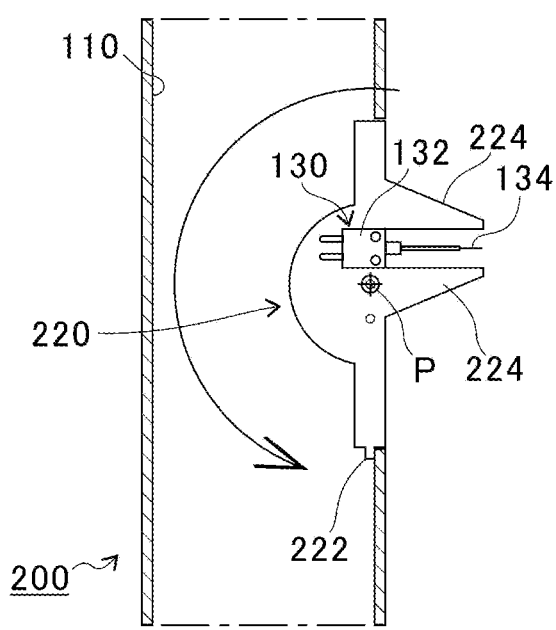
FIGS. 7($a$) and 7($b$) illustrate another example of a space temperature scanner, with FIG. 7($a$) showing a state where the thermocouple units 130 are in use, and FIG. 7($b$) showing a state where the thermocouple units 130 are stowed.
Figure 7B:
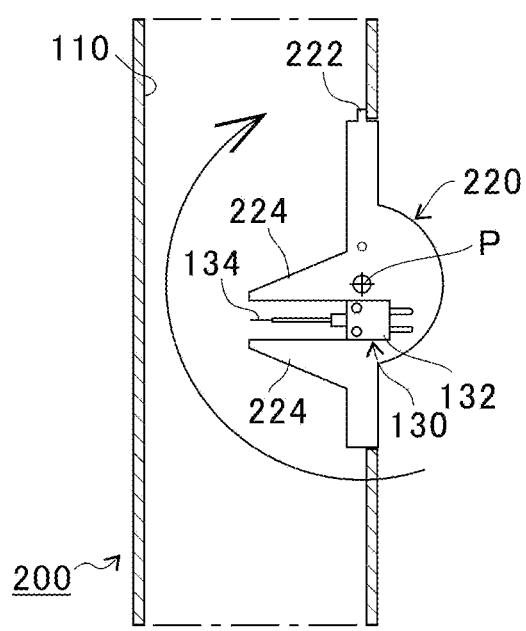

FIGS. 7 and 8 are diagrams illustrating other examples of temperature measurement using the space temperature scanner. FIG. 7(a) shows the state where the thermocouple units 130 are in use, and FIG. 7(b) shows the state where the thermocouple units 130 are stowed. Note that constituent elements that are the same as those of the space temperature scanner (scanner 100) described above are denoted by the same reference signs, and descriptions are not given for them.

The space temperature scanner 200 shown in FIGS. 7(a) and 7(b) (hereinafter, called a scanner 200) includes attachment units 220 that can rotate relative to the support member 110, and differ in this respect from the attachment units 120 of the scanner 100. The thermocouple units 130 are removably attached to the attachment units 220, and can rotate in the vertical direction about a rotation center P. A projection 222 is formed on one end portion of each of the attachment units 220.

In the state shown in FIG. 7(a), the fine-wire thermocouple 134 is arranged on the outside. The space temperature can therefore be measured by the thermocouple unit 130. When the attachment unit 220 is rotated from the state shown in FIG. 7(a), the projection 222 on the one end portion of the attachment unit 220 abuts against the wall surface of the support member 110, and the thermocouple unit 130 is thus stowed inside the support member 110 as shown in FIG. 7(b).

According to the above configuration, thermocouple units 130 that are attached to the support member 110 but not used when obtaining the space temperature can be stowed inside the support member 110. The fine-wire thermocouples 134 of the thermocouple units 130 can thus be favorably protected.

According to the above configuration, it is not necessary to remove thermocouple units 130, thus making it possible to improve the work efficiency. Additionally, because there is no need to remove thermocouple units 130, it is possible to reduce the number of opportunities for the fine-wire thermocouples 134 of the thermocouple units 130 to come into contact with surrounding objects. This therefore makes it possible to favorably prevent damage to the fine-wire thermocouples 134 that can occur during removal.

Furthermore, the attachment unit 220 (as shown in FIGS. 7(a) and 7(b)) includes guard portions 224 provided at positions surrounding the fine-wire thermocouples 134 of the thermocouple units 130. This therefore prevents the fine-wire thermocouples 134 from coming into contact with obstacles when taking space temperature measurements, thus making it possible to favorably prevent damage to the fine-wire thermocouples 134.

Figure 8A:
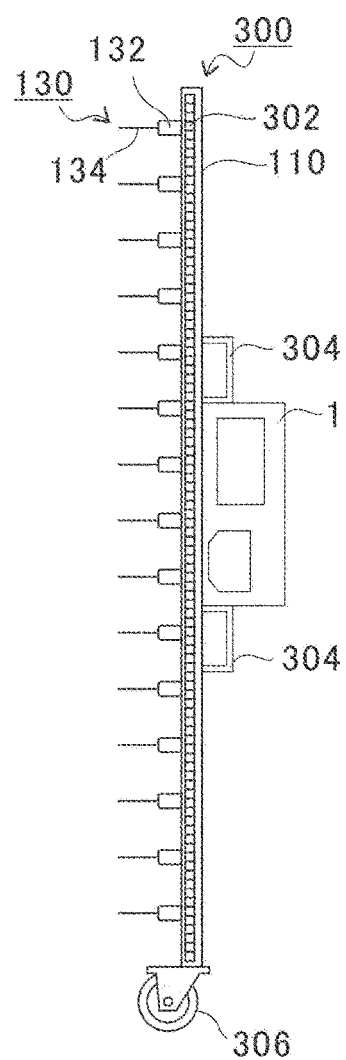
FIGS. 8($a$) and 8($b$) illustrate another example of temperature measurement using a space temperature scanner, with FIG. 8($a$) showing an overall view of the space temperature scanner and FIG. 8($b$) illustrating space temperature measurement performed using the scanner.
Figure 8B:
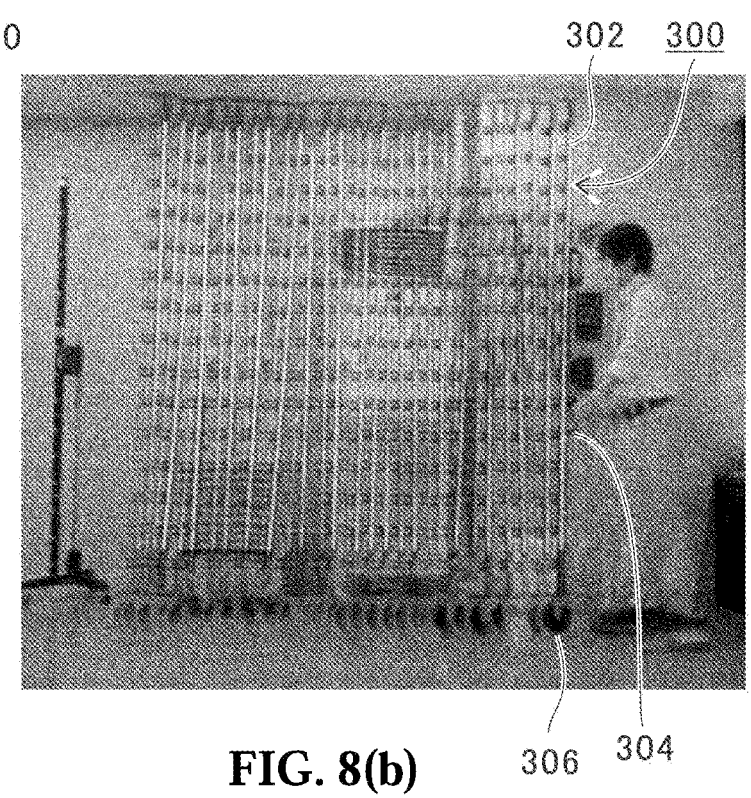

FIG. 8(a) is an overall view of a space temperature scanner (hereinafter, called a scanner 300), and FIG. 8(b) is a diagram illustrating space temperature measurement performed using the scanner 300 in FIG. 8(a). As shown in FIG. 8(a), LEDs 302 that change color according to the temperature are attached to the support member 110 of the scanner 300. Accordingly, the space temperatures that have been measured can be visually perceived by observing the color of the LEDs 302.

Also, handles 304 for gripping by the worker are provided at vertically intermediate positions on the support member 110. The worker can therefore grip the handles 304 in order to move the scanner 300, thus making it possible to improve workability.

Furthermore, the scanner 300 is provided with a wheel 306 that is fixed to the lower end of the support member 110. Accordingly, the wheel 306 fixed to the lower end of the support member 110 can roll on the floor of the measurement space while the scanner 300 is moved. This therefore makes it possible to favorably suppress vertical shake in comparison with the case where the wheel 306 is not provided and the scanner 300 is moved while the support member 110 is held by the worker.

When space temperature measurement is to be performed using the scanner 300 shown in FIG. 8(a), the worker grips the handles 304 and rolls the wheel 306 while taking space temperature measurements, and still images of the scanner 300 are captured at a predetermined interval during measurement. The image shown in FIG. 8(b) is then generated by superimposing the support member 110 and LED portions of multiple captured still images (second embodiment of display method).

According to the above configuration, by referencing the image shown in FIG. 8(b), it is possible to visually perceive the space temperature (temperature variation according to position) based on the color of the LEDs 302. As another example, if a moving image of the scanner 300 at a fixed position is captured, it is also possible to perceive variation in temperature over time based on the color of the LEDs 302.

The following describes another space temperature display method. FIGS. 9(a), 9(b), and 9(c) are diagrams illustrating a third embodiment of a space temperature display method. In the space temperature display method of the third embodiment, first, a worker measures the space temperature of a predetermined space (hereinafter, called a predetermined space 400) shown in FIG. 9(a) while moving the scanner 100. In the example shown in FIG. 9(a), the space temperature is measured while moving from right to left.

After space temperature measurement has been performed, the measured space temperature values are acquired from the logger 140 (see FIG. 1), and tile images 402 are generated so as to show a temperature distribution of the measured space temperatures by color as shown in FIG. 9(b). The vertical positions of the tile images 402 shown in FIG. 9(b) indicate the height during measurement, and the horizontal positions indicate a time axis from right to left.

When tile images are generated as described above, the tile images 402 are displayed superimposed on a 2D image of the predetermined space (the space in which space temperature measurement was performed) as shown in FIG. 9(c). Specifically, the tile images 402 shown in FIG. 9(b) are enlarged to a size appropriate for the 2D image (photograph) of the predetermined space 400, and the enlarged tile images are displayed superimposed on the 2D image.

According to the above configuration, by referencing the 2D image shown in FIG. 9(c), it is possible to visually perceive the temperature distribution at various locations in the measurement space. In particular, due to the tile images 402 being enlarged to fit the 2D image and then displayed superimposed thereon, it is possible to match measurement positions with measured temperatures. In other words, the temperatures at corresponding positions can be understood without acquiring position information. For this reason, a device for acquiring position information is not necessary, and processing for position information is also not necessary.

Figure 10A:
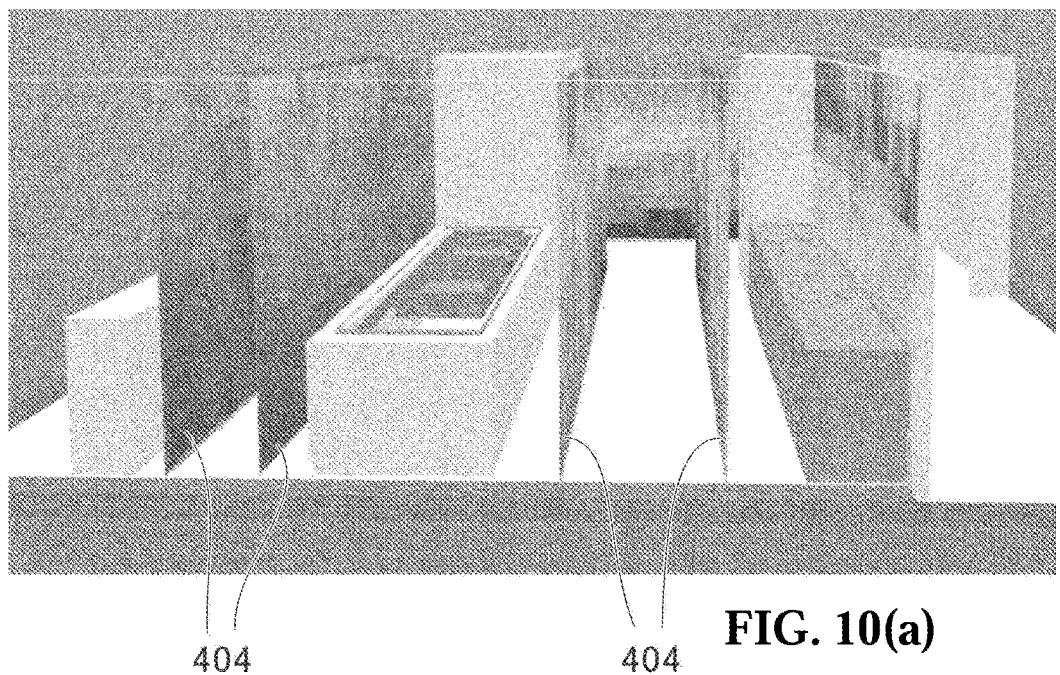
FIGS. 10($a$) and 10($b$) illustrate fourth and fifth embodiments of a space temperature display method.
Figure 10B:
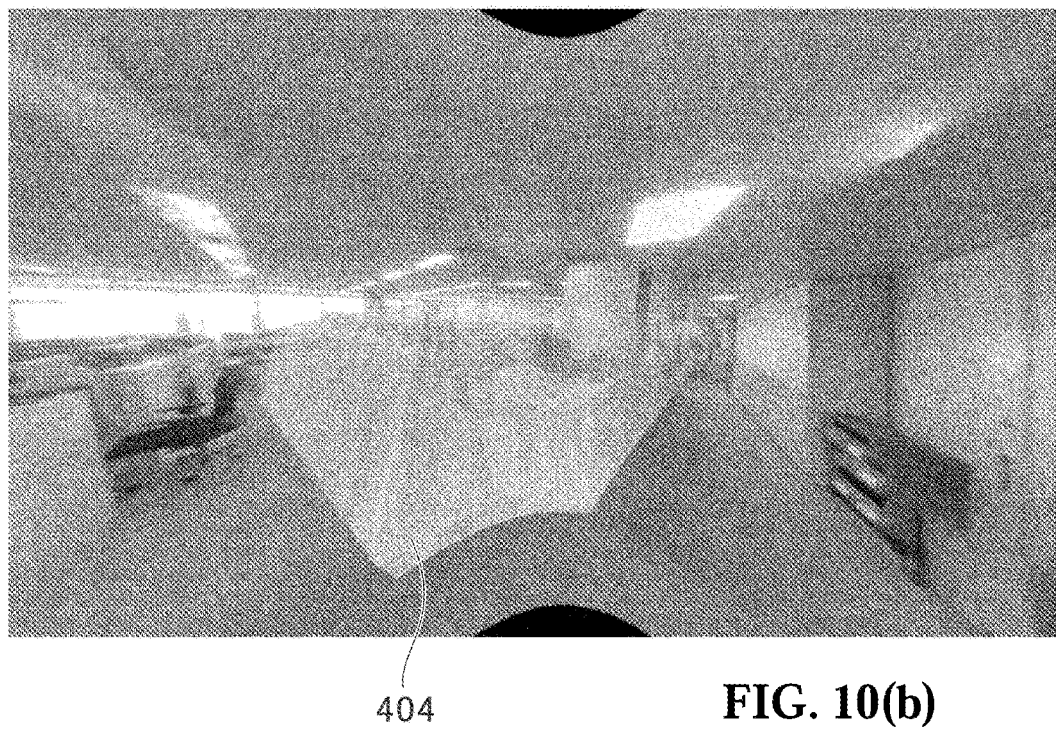

FIGS. 10(a) and 10(b) are diagrams illustrating a fourth embodiment and a fifth embodiment of a space temperature display method, respectively. FIG. 10(a) is a diagram illustrating the fourth embodiment of a space temperature display method. FIG. 10(b) is a diagram illustrating the fifth embodiment of a space temperature display method. In FIGS. 10(a) and 10(b), elements of the process that are similar to those previously described in the space temperature display methods of the first to third embodiments are omitted.

In FIG. 10(a), the space temperature display method of the fourth embodiment, after measuring the space temperature of a predetermined space, curtain images 404 showing the temperature distribution of the measurement space temperature by color are displayed superimposed on a 3D model of the space in which space temperature measurement was performed, as shown in FIG. 10(a). According to this configuration, by referencing the 3D model of the measurement space, it is possible to visually perceive the space temperature at various locations throughout the measurement space. In particular, due to arranging the curtain images 404 in the 3D model, the space temperature at a desired location can be found by changing the viewpoint of the 3D model (panning or rotating the 3D model).

In FIG. 10(b), the space temperature display method of the fifth embodiment, after measuring the space temperature of a predetermined space, curtain images 404 showing the temperature distribution of the measurement space temperature by color are displayed superimposed in a VR spatial image, as shown in FIG. 10(b). According to this configuration, by referencing the VR spatial image, it is possible to visually perceive the space temperature at various locations throughout the measurement space while moving through the VR space.

Although preferred embodiments of the present invention have been described above with reference to the accompanying drawings, the present invention is needless to say not limited to these examples. A person skilled in the art will appreciate that various modifications and alterations can be made within the scope of the claims, and that all such modifications and alterations are also naturally encompassed in the technical scope of the present invention.

INDUSTRIAL APPLICABILITY

The present invention is applicable as a space temperature scanner for measuring a temperature distribution in a space.

The invention claimed is:
1. A space temperature scanner comprising:
a bar-shaped portable support member;
a plurality of attachment units arranged along a straight line on the support member; and
a plurality of thermocouple units configured to be removably attached to the attachment units to measure temperatures of a space;
a logger that stores data indicating the temperatures of the space measured by the plurality of thermocouple units,
wherein the plurality of thermocouple units are electrically connected to the logger by being attached to the plurality of attachment units and are electrically separated from the logger by being separated from the plurality of attachment units, and
the plurality of thermocouple units are selectively enabled by mounting a part of the plurality of attachment units, and selectively disabled by removing the other attachment units, and the temperatures of the space are measurable while the space temperature scanner is moving.

2. A space temperature scanner comprising:
a bar-shaped portable support member;
a plurality of attachment units arranged along a straight line on the support member; and
a plurality of thermocouple units configured to be removably attached to the attachment units to measure temperatures of a space;
a logger that stores data indicating the temperatures of the space measured by the plurality of thermocouple units,
wherein the support member is configured such that the plurality of thermocouple units are rotated to be exposed from or stowed in the support member, and
the plurality of thermocouple units are selectively enabled by rotating and exposing a part of the plurality of attachment units to the outside the support member, and selectively disabled by rotating and stowing the other attachment units inside the support member, and the temperatures of the space are measurable while the space temperature scanner is moving.

3. The space temperature scanner according to claim 2, wherein the portable support member forms part of a plurality of support members that are coupled together by a joint, a hinge, or a slide rail.

4. The space temperature scanner according claim 2, wherein at least one of the plurality of thermocouple units includes a reflection member for motion capture.

5. The space temperature scanner according to claim 2, wherein the support member includes an acceleration sensor.

6. The space temperature scanner according to claim 2, further comprising a wheel fixed to a lower end of the support member.

7. The space temperature scanner according to claim 2, further comprising LEDs that change color according to the temperature of the space.

* * * * *